Patented Sept. 4, 1951

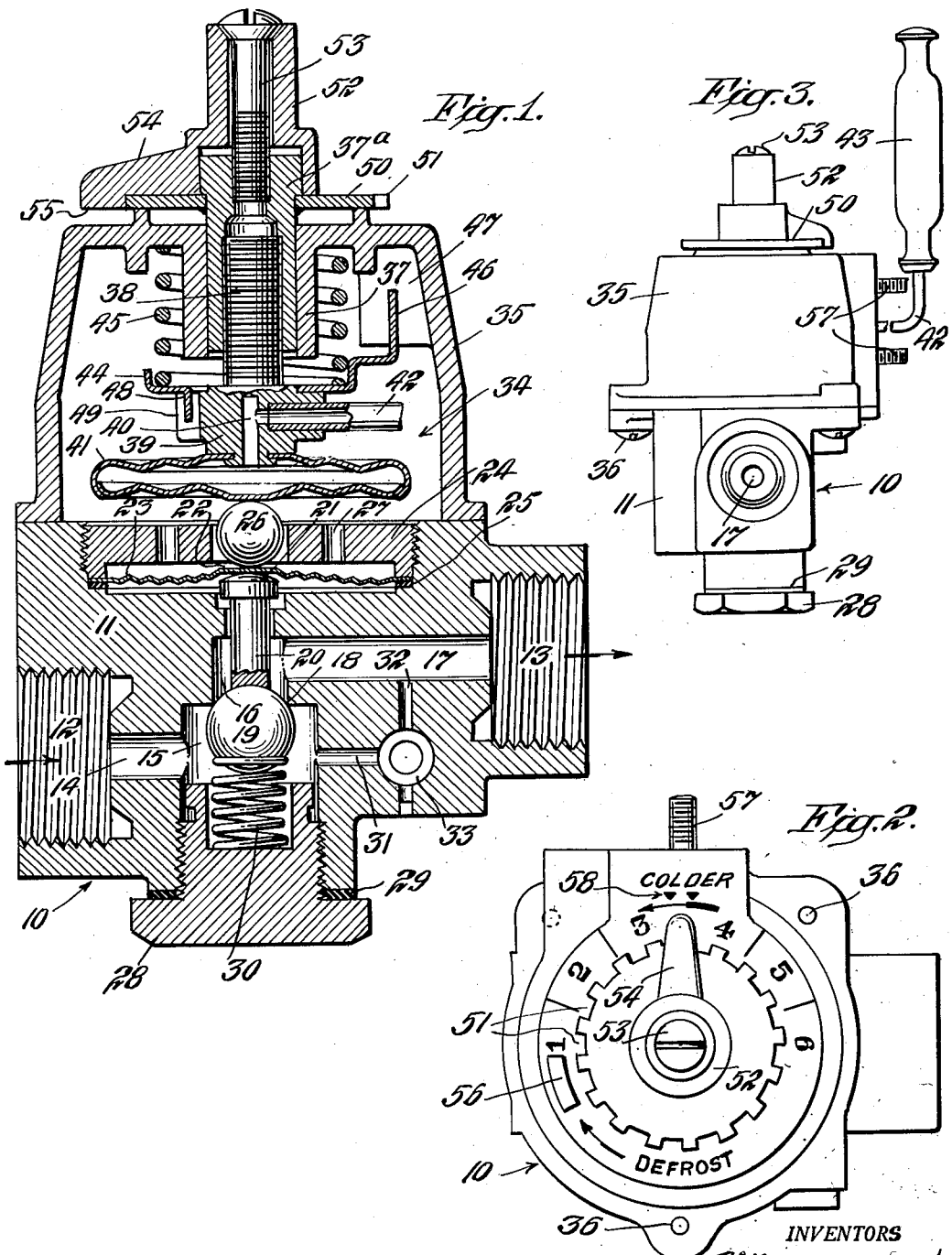

2,566,655

UNITED STATES PATENT OFFICE 2,566,655

THERMOSTATIC CONTROL

Wallace W. Compton, Madisonville, Ky., and Philip A. Cooper, Evansville, Ind., assignors to Servel, Inc., New York, N. Y., a corporation of Delaware Application February 28, 1948, Serial No. 11,946

4 Claims. (Cl. 236—92)

This invention relates to control mechanisms and more particularly to a mechanism for controlling the flow of fuel gas to a gas burner.

Although not limited to, our improved control mechanism is particularly adapted for controlling the supply of fuel gas to the gas burner of a heat operated refrigerating apparatus of the continuous absorption type.

An object of our invention is to provide a small compact control mechanism that requires a minimum of parts, is easily machined and assembled, remains in perfect adjustment and is inexpensive to manufacture.

Another object of our invention is to provide a thermostatically controlled valve wherein the temperature responsive mechanism and the valve mechanism are each assembled as distinct units which may be connected and disconnected without disturbing any mechanism contained in either of such units.

The invention, together with the above and other objects and advantages will be more clearly understood from the following detailed description and accompanying drawing, wherein:

Fig. 1. is a vertical sectional view of a control mechanism incorporating our invention;

Fig. 2 is a top plan view, on a smaller scale, of the control mechanism shown in Fig. 1; and Fig. 3 is a side elevational view, showing the actual size of the control mechanism.

For the sake of clarity in illustration, the control mechanism shown in Fig. 1 is approximately twice the size of such mechanism as actually manufactured; in Fig. 2 the control is shown as approximately 1½ times its actual size; whereas, in Fig. 3 the control is shown in actual size.

Referring now to the drawing, reference character 10 designates generally our improved control mechanism. This mechanism comprises a body member 11 formed to provide an inlet passage 12 and an outlet passage 13. Inlet passage 12 is connected with a suitable supply of fuel gas; whereas, outlet passage 13 may be connected, for example, to a gas burner, not shown, for supplying heat to the vapor expeller of an absorption refrigerating system. The gas flows from the inlet passage through a passage 14 into a valve chamber 15. From the valve chamber the gas flows through passages 16 and 17 into the outlet passage 13.

In this embodiment of our invention, the entrance to passage 16 forms a valve seat 18 which is adapted to cooperate with a stainless steel ball valve 19 for controlling the flow of gas. A round valve stem or plunger 20, formed with a concave lower portion which conforms with the curvature of ball valve 19, extends from passage 16 through an opening in the body member 11 into a circular recess in the upper portion of the body member. Valve stem 20, which is free to move relative to the ball valve 19, is provided with a rounded head 21, which head is adapted to bear against a flat portion 22, of a flexible stainless steel diaphragm 23. Diaphragm 23 is held in place by a plug member 24 which is screwed into the recess in the upper portion of the body member. A sealing gasket 25 is provided between the diaphragm 23 and the body member. Plug member 24 is formed with a central opening adapted to receive a stainless steel ball 26. Plug 24 is provided also with a plurality of vent openings 27. The lower portion of body member 11 is drilled and tapped to receive a threaded plug 28. A sealing gasket 29 is provided between the plug 28 and the body member. As shown, plug 28 is formed with a recess in its upper portion adapted to receive a helical compression spring 30, which compression spring supports the ball valve 19 and is adapted to urge this valve toward its closed position. The body member is drilled to provide by-pass ports 31 and 32 connected by an opening 33, which opening is adapted to receive an adjusting screw, not shown, for adjusting the amount of gas that is by-passed from chamber 15 to passage 17. From the above, it will be seen that in accordance with our invention, the valve proper is contained within a sealed body member, which body member forms a separate unit or subassembly that is fabricated and assembled independently of the operating or thermostatic portion of the mechanism, to be described presently.

Referring now to the upper portion of Fig. 1, in accordance with our invention, a thermostatic control, indicated generally by reference character 34, is contained within a casing 35. Casing 35 is secured to body member 11 in any suitable manner, as by machine screws 36. For reasons to be described later, the joint between the body member 11 and the casing 35 need not be sealed, nor is there need for any particular nicety of fit between the body member and the casing. The casing is formed with an integral inwardly projecting sleeve 37, which is adapted to receive a rotatable control shaft 37ª. Shaft 37ª is drilled and tapped to receive the threaded end of a stem 38, the lower portion of which stem is formed with an integral hub member 39. Hub member 39 is formed with a passage 40, one end of which opens into an expansible-contractible bellows or hollow diaphragm 41. Bellows 41 is rigidly secured in gas tight relation to hub member 39. To the opposite end of passage 40 of the hub member is secured one end of a capillary tube 42, the opposite end of which tube is secured to a thermal bulb 43 which may be positioned in thermal contact with the evaporator or cooling element, not shown, of an absorption refrigerating system. The expansible bellows 41, capillary tube 42 and thermal bulb 43 constitute an expansible fluid thermostat which is filled with a suitable volatile fluid that expands with an increase in temperature and is reduced in volume with a decrease in temperature.

A spring retaining cup 44 is mounted on hub member 39 and is adapted to be contacted by one end of a compression spring 45, the opposite end of which spring bears against the upper inner surface of the casing 35. At one side, the retaining cup 44 is formed with a bifurcated extension 46 adapted to straddle a flange or projection 47 formed on the inside of the casing 35. The opposite side of spring retaining cup 44 is formed with a projection 48 which is adapted to fit within a slot 49 formed in the hub member 39. A circular dial 50, formed with slots 51 in the periphery thereof, is attached, as by brazing, to the control shaft 37ᵃ. An adjustment knob 52 is mounted upon the upper portion of the control shaft 37ᵃ and is attached thereto by a machine screw 53. Knob 52 is formed with an outwardly projecting finger or pointer 54, which pointer is formed with a projection 55 adapted to fit within one of the slots 51 of the dial 50. A stop 56 is provided on the upper surface of the casing 35, so that the adjustment knob 52 cannot be turned through more than one revolution after assembly. As shown in Figs. 2 and 3 the casing 35 is provided with a pair of studs 57 on one side thereof for attaching the control mechanism to an appropriate part of a refrigerator or other appliance with which the control mechanism may be used. As shown in Fig. 2, suitable indicia are provided on the upper surface of casing 35.

In fabricating our improved control mechanism, the body member 11, which contains the gas passages and the valve proper, is machined and assembled as a unit separate from the casing 35, which contains the thermostat and adjustment elements. That is, each of these units may be assembled by separate crews of mechanics and then the two subassemblies may be assembled by a third crew. Starting with the lower portion, for example, of the control mechanism, the body member 11 is drilled and tapped where necessary. It is to be noted that all of the drilled holes and passages are at right angles to the faces of the body member through which they are drilled, thereby simplifying the drilling and tapping operations. With the body member drilled and tapped, the valve stem 20 is placed in position, the sealing gasket 25 and flexible diaphragm are located in the recess in the upper portion of the body member and the plug 24 is screwed into the recess sealing the body member. Then the ball valve 19 and spring 30 are arranged in the chamber 15 and finally the plug 28 with the sealing gasket 29 applied thereto is screwed into the threaded opening in the lower portion of the body member, thereby completing the assembly of the lower portion of the control mechanism.

Simultaneous with the assembling of the lower portion of the control mechanism the upper portion thereof may be assembled. In assembling the upper portion of the mechanism, the threaded stem 38 with its integral hub member 39, the bellows 41, the capillary tube 42, thermal bulb 43, spring retaining cup 44 and compression spring 45 are assembled in the manner shown. Then the control shaft 37ᵃ with the dial 50 freely mounted thereon is screwed onto the stem 38, the bifurcated extension 46 and the projection 48 of the spring retainer 44 serving to prevent rotation of the stem during this operation.

The ball 26 is then positioned in the central opening of plug member 24 and the upper portion of the mechanism is attached to the lower position thereof as by screws 36. The initial adjustment is then made by turning the control shaft 37ᵃ until the desired rocking point is reached, that is, shaft 37ᵃ is rotated clockwise or counterclockwise, as the case may be until the flat lower portion of the bellows just contacts the ball 26, after which the adjustment knob 52 is mounted upon the upper portion of the shaft with its projection 55 fitting into the nearest slot in the periphery of the dial 50. The screw 53 is then put in place and the dial 50 is brazed to the shaft 37ᵃ, making it an integral part of the control shaft assembly. The location of the pointer 54 for initial setting is indicated by two triangular marks 58, as shown in Fig. 2.

From the above it is seen that our improved control mechanism is formed of two separate units or subassemblies. The two subassemblies are connected in a manner such that there are no interlocking or interconnecting parts which must be located in exact positions relative to each other before the two assemblies may be united. The bellows 41 is out of the gas stream and, since the body member is sealed by the diaphragm 23 and sealing gasket 25, no sealing gasket is required between the subassemblies. The only requirement is that the holes in the two assemblies which receive the screws 36 be in alignment, and even here a reasonable tolerance is permitted.

In operation, an increase in temperature, for example, of the evaporator or the food storage space of the refrigerator with which the control is used, increases the pressure of the volatile fluid in thermal bulb 43, capillary tube 42, and bellows 41, which expands the bellows. Such expansion is communicated to the ball valve 19 as a downward motion through ball 26, flexible diaphragm 23 and valve plunger 20. This opens the valve and allows fuel gas to flow therethrough to the burner, not shown. As the evaporator or refrigerator temperature is lowered, a converse action is effected, and compression spring 30 closes the valve, cutting off the flow of gas. As viewed in Fig. 2, a clockwise movement of the adjustment knob 52 raises the bellows 41, so that more pressure and movement are required to open the valve, and higher refrigerator temperatures result. A counterclockwise movement of the adjustment knob provides a converse effect, and lower refrigerator temperatures are obtained. The stop 56 limits rotation of the adjustment knob to slightly less than one revolution.

In the illustrated embodiment of our invention, the range of movement in temperature control is approximately 210°, after which the charge in the bellows-capillary tube-thermal bulb assembly is completely evaporated, and relatively small expansion of the bellows takes place. Therefore, when the adjustment knob is rotated clockwise until the pointer 54 contacts the stop 56 the valve will be held closed no matter how warm the refrigerator becomes, thus affording a means for defrosting the evaporator. During defrosting periods, and when the valve is completely closed in the normal freezing cycle, a small amount of gas flows through the by-pass ports 31 and 32 to keep the burner in operation. Such by-pass flow is adjusted by a suitable adjusting screw, not shown.

Having thus described our invention, we wish it understood that we do not desire to be limited to the exact details of construction illustrated and described, for obvious modifications may occur to a person skilled in the art.

What is claimed is:

1. A valve mechanism including in combination a body member provided with inlet and outlet passages, said passages being connected by a valve chamber provided with a valve seat, a ball valve member within said chamber adapted to engage said seat, means urging said ball valve member toward said seat, a valve plunger arranged concentric with said valve seat within said body member for moving said ball valve member away from said seat, a flexible diaphragm within said body member adapted to engage said valve plunger and to form a closure for said body member, a casing removably mounted upon said body member, a thermostat for operating said valve plunger, said thermostat including an expansible-contractible bellows within said casing, and a second ball member freely mounted between said bellows and said diaphragm for transmitting motion between said bellows and said valve plunger.

2. A valve mechanism as set forth in claim 1 wherein the ball valve member, valve plunger, flexible diaphragm, second ball member and expansible-contractible bellows are each unattached to each of the others whereby the body member and the casing may be assembled and disassembled without disturbing any mechanism contained within either of such elements.

3. A valve comprising a valve housing having a plurality of coaxial bores forming a valve chamber, a port in the valve chamber and a valve seat therebetween, a ball valve in the chamber, a spring for pressing the ball valve toward the valve seat, a valve plunger in the port for moving the ball valve away from the valve seat, a flexible diaphragm overlying the valve port and the end of the valve plunger for sealing the valve chamber, a thermostat having an expansible element coaxial with the valve plunger, and a ball between the expansible element of the thermostat and the flexible diaphragm on the valve housing for transmitting motion in a straight line from the thermostat to the valve plunger to move the ball valve away from the valve seat.

4. A valve mechanism comprising a body member having a plurality of coaxial bores, a plug for closing the bore at one side of the body member to form a valve chamber, a flexible diaphragm for closing the bore at the opposite side of the body member, said coaxial bores providing a port from the valve chamber and a valve seat therebetween, a ball valve member in the valve chamber, a spring for yieldingly pressing the ball valve toward the valve seat, a valve plunger in the innermost bore in axial alignment with the port and valve seat and extending between the diaphragm and ball valve, a casing removably mounted on the body member, a thermostat having an expansible element, means for mounting the thermostat in said casing in axial alignment with the concentric bores in the body member, adjusting means for moving the thermostat bodily in the casing along said axis, and a ball between said flexible diaphragm on the body member and the expansible element of the thermostat for transmitting motion from the thermostat to the valve plunger to move the ball valve away from the valve seat.

WALLACE W. COMPTON.
PHILIP A. COOPER.

REFERENCES CITED

The following references are of record in the file of this patent:

UNITED STATES PATENTS

| Number | Name | Date |
|--------|------|------|
| 1,958,814 | Carson | May 15, 1934 |
| 2,079,579 | Shrode | May 4, 1937 |
| 2,113,351 | Lear | Apr. 5, 1938 |
| 2,471,448 | Platon | May 31, 1949 |